W. H. DOBSON.
Saw-Setting Machines.
No. 139,124. Patented May 20, 1873.
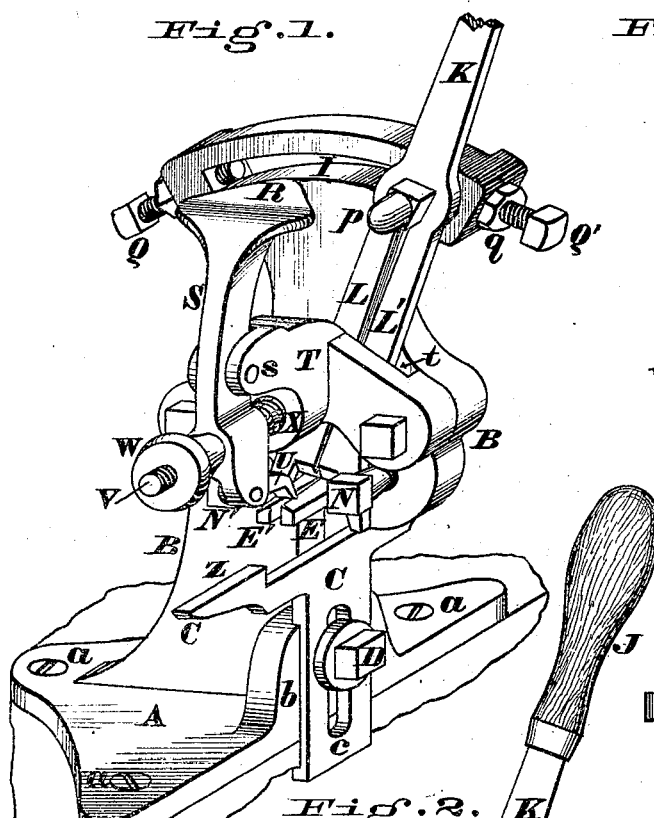
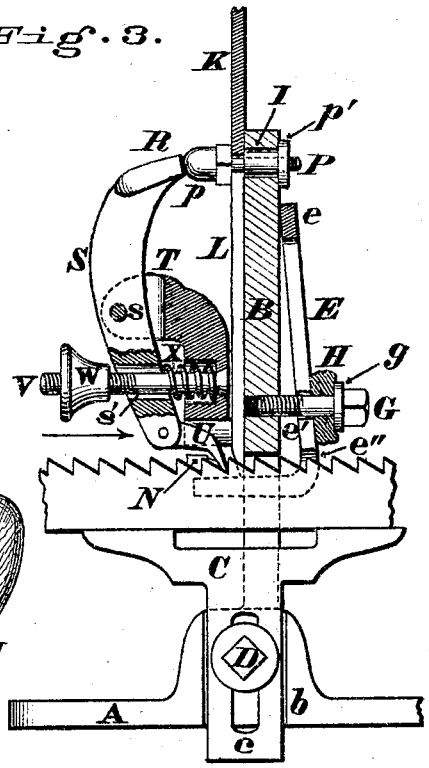
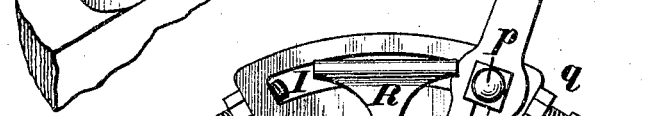
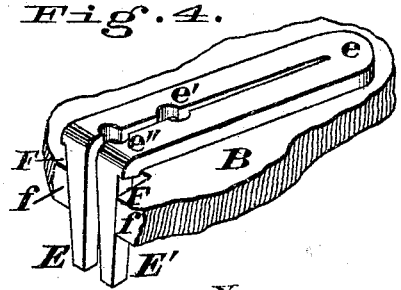
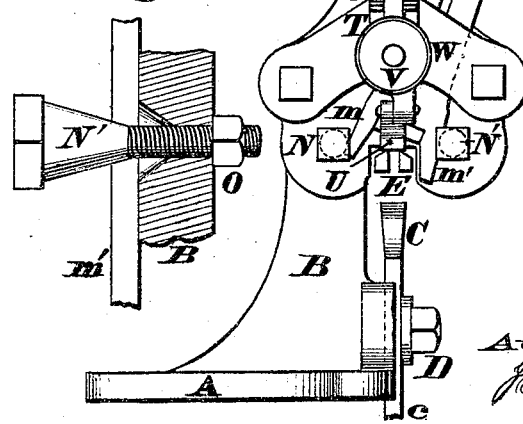
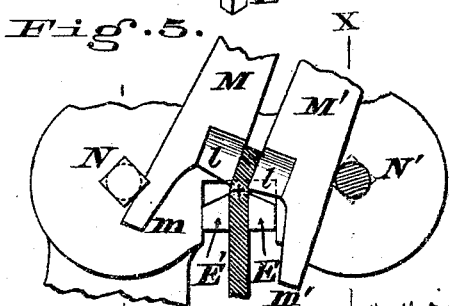

UNITED STATES PATENT OFFICE.

WILLIAM H. DOBSON, OF CINCINNATI, OHIO, ASSIGNOR TO J. A. FAY & CO., OF SAME PLACE.

IMPROVEMENT IN SAW-SETTING MACHINES.

Specification forming part of Letters Patent No. 139,124, dated May 20, 1873; application filed March 21, 1873.

*To all whom it may concern:*

Be it known that I, WILLIAM H. DOBSON, of Cincinnati, Hamilton county, Ohio, have invented a new and useful Saw-Set, of which the following is a specification:

Nature and Objects of the Invention.

My invention is designed for use on "band," "web," and like saw-blades of uniform width; and consists of a mechanical device which enables the user, by simply vibrating a handle, to impart a uniform right and left "set" to the entire series of teeth at one continuous operation, the saw-blade being fed automatically forward the proper "pitch distance" at every succeeding stroke, and each member of the machine being individually adjustable, so as to correspond with the precise thickness, width, pitch, and desired set of the saw or saws to be operated upon.

Specific Description.

Figure 1 is a front perspective view of a machine embodying my invention. Fig. 2 is a front elevation of the same. Fig. 3 is a vertical section from front to rear. Fig. 4 is an under-side and rear view of the vise, with a portion of the stock. Fig. 5 is an enlarged front view of the parts which operate directly upon the saw. Fig. 6 is a section in the line $x\ x$.

A is the foot and B the upright of a cast-iron frame or head-stock, to which all the operative parts are attached. Holes $a$ in foot A enable the said stock to be screwed fast to a block, bench, or other suitable foundation. A T-shaped rest, C, whose level top supports the back of the saw-blade, has a slotted stem, $c$, for the passage of a screw, D, by which it is attached to the stock at any height to suit the width of the saw or saws to be operated upon. In order that the said top or bearing surface of the rest C may be retained to horizontality at every adjustment, its stem $c$ is caused to occupy a shallow recess, $b$, in the side of the head-stock. That portion of the saw-blade immediately below the teeth to be operated upon is griped and guided by an L-formed steel vise or clamp, whose cheeks E E' are so united at their upper ends, as at $e$, as to spring slightly apart when at liberty, and are formed tapering at their lower ends to engage within the tapering recess $f$ on the under side of a projection, F, from the side of the stock. A bolt, G, traverses an orifice, $e'$, in the vise E E', and being screwed into the head-stock, the horizontal tapering portions of the vise are thereby caused to approach each other until their distance is just sufficient to grasp, without too tightly binding, that portion of the saw-blade just below the teeth, so as to hold the blade firmly during the action of setting, and to preserve its rectilinearity and guide it rearward at each impulse of the feed-pawl. The opposing surfaces of the cheeks E E' are hollowed or notched so as to form an opening, $e''$, through which the set-teeth of the saw can freely pass without touching the said cheeks. Interposed between the collar $g$ of the screw G and the rear side of the stock is a rubber washer, H, which operates as a cushion between the said collar and the back of the vise, causing a uniform distribution of pressure, and preventing the jarring loose of the vise. At or near the top of the head-stock is a slot, I, in the form of a circular arc, concentric with a point, $+$, immediately over the parting of the two horizontal cheeks of the vise. J is the operating handle or lever, having a flat steel blade, K, whose lower end is separated into two portions, L L', which terminate in spurs M M', whose edges $m\ m'$ pressing against the adjustable studs N N', the lower extremity of the blade is thereby confined to its proper center of gyration and its two members are, except just at the middle of each stroke, pressed toward each other, so as to tightly gripe the saw-tooth. At the middle or vertical position of said blade, the spring of its members causes them to momentarily separate sufficiently to allow the saw-blade to be passed forward by the feed mechanism, to be presently described.

In order to enable the adaptation of this part of the machine to any thickness of saw the studs N N' are given a conical form, as shown, so that on being screwed further into the stock they contract the interval between them and cause the members L L' to press more closely together. By this means the instrument is made capable of adjustment, so as to just allow the free passage of the saw-blade at the moment of feeding, and yet tightly gripe the blade the instant that the handle is pressed to the right or to the left. A lock-nut, O, on each stud holds it firmly to any specific adjustment. The portions $l$ of the lower end of the blades L L' between the spurs M M' may be brought to a V-edge, as shown. Projecting horizontally through the blade K is a wrist, P, whose portion, on the rear side of the blade, has a nut, $p'$, which occupies the slot I. Screws Q Q', whose points enter the ends of the slot I, limit the amplitude of stroke of the blade K, as the judgment of the operator may dictate. Lock-nuts $q$ on the said screws hold them firmly to their proper adjustments. The wrist P is armed in front with a steel knob or tappet, $p$, which, at the middle of each right or left stroke, presses backward the V or cam formed head R of a lever, S, fulcrumed at $s$ to a bracket, T, which, having a slight interval, $t$, between it and the stock, serves to confine, while permitting the proper lateral play of, the blade K. Hinged or pivoted to the lower end of lever S is a pawl, U, whose point, engaging in the teeth of the saw, operates to advance the latter the distance of one tooth as the blade K passes the center of its stroke. A stud, V, traversing orifice $s'$ in lever S, and, being screw-threaded, receives a milled nut, W, which, being screwed in or out, diminishes or increases the amplitude of vibration of the lever S, and, consequently, the feed. A spring, X, restores the lever to its normal condition after each action of the tappet, as explained.

The above provision enables the instrument to be precisely gaged to the pitch of saw or saws to be operated upon.

Operation.

The machine having been screwed to a suitable foundation, and the several parts duly adjusted to thickness, width, pitch, and set of the saw or saws to be operated upon, a blank or unset saw-blade is inserted backward at the point Z. The operator has then only to vibrate the handle J until the saw has passed through the machine, when it will be found to have all its teeth properly and uniformly set.

The above-described form of my improvement has been selected for the purpose of illustration because it is that which I have reduced to successful application, and because adapted for use on band and other saws of uniform width; but it is manifest that the said form may be varied in non-essential particulars—for example, a slight modification in which the saw is clamped in a suitable shoe or runner supported on the rest would enable the apparatus to be used for saws of unequal width, from heel to point, without changing any of the essential parts of the apparatus; or, the described adjustable rest being replaced by an adjustable wrist or arbor, my device may be employed for setting the teeth of a circular saw.

Another obvious modification of my device might consist in operating the lever by power, the connection or disconnection with which might be under momentary control of the operator by means of a friction-clutch, or otherwise.

Claims.

I claim herein as new and of my invention—

1. In combination with suitable supporting, feeding, and setting devices, the L-formed clamp or vise E E' $e$ $e'$ $e''$, occupying the tapering recess $f$, and having the described (or equivalent) adjusting screw or bolt G.

2. In combination with the subject-matter of the preceding claim, the collar $g$ and rubber washer H.

3. In combination, substantially as set forth, with suitable supporting, feeding, and clamping devices, the provision of handle J, blade K L L' $l$ $l'$ M $m$ M' $m'$, and adjustable conical studs N N' for setting the saw-teeth, in the manner explained.

In testimony of which invention I hereunto set my hand.

W. H. DOBSON.

Attest:
 GEO. H. KNIGHT,
 S. B. SPEAR.